(12) United States Patent
Kayama

(10) Patent No.: US 8,449,401 B2
(45) Date of Patent: May 28, 2013

(54) GOLF GLASSES

(75) Inventor: Yuji Kayama, Tokyo (JP)

(73) Assignee: Paris Miki Holdings Inc., Chuo-Ku, Tokyo (JP)

( * ) Notice: Subject to any disclaimer, the term of this patent is extended or adjusted under 35 U.S.C. 154(b) by 0 days.

(21) Appl. No.: 13/369,682

(22) Filed: Feb. 9, 2012

(65) Prior Publication Data

US 2012/0258814 A1 Oct. 11, 2012

(30) Foreign Application Priority Data

Apr. 5, 2011 (JP) .................................. 2011-083253

(51) Int. Cl.
*A63B 69/36* (2006.01)
*G02C 7/16* (2006.01)

(52) U.S. Cl.
USPC ............................. 473/210; 473/268; 351/45

(58) Field of Classification Search
USPC ............ 473/207, 210, 266, 267, 268; 351/45, 351/46, 158
See application file for complete search history.

(56) References Cited

U.S. PATENT DOCUMENTS

| | | | | |
|---|---|---|---|---|
| 1,510,850 | A * | 10/1924 | Jacobs et al. | 351/45 |
| 2,663,021 | A * | 12/1953 | Douglass | 2/433 |
| 3,268,228 | A * | 8/1966 | Novack | 473/210 |
| 3,487,549 | A * | 1/1970 | Engesser | 33/262 |
| 4,022,475 | A * | 5/1977 | Todd | 473/210 |
| 4,070,097 | A * | 1/1978 | Gelber | 359/581 |
| 4,168,111 | A * | 9/1979 | Baines | 351/46 |
| 4,531,743 | A * | 7/1985 | Lott | 473/210 |
| 5,488,438 | A * | 1/1996 | Cochran | 351/45 |
| 6,886,937 | B2 * | 5/2005 | Moravec et al. | 351/159.62 |

FOREIGN PATENT DOCUMENTS

| | | |
|---|---|---|
| JP | 62-160982 | 10/1987 |
| JP | 2003-295127 | 10/2003 |

* cited by examiner

*Primary Examiner* — Nini Legesse
(74) *Attorney, Agent, or Firm* — Renner, Kenner, Greive, Bobak, Taylor & Weber

(57) ABSTRACT

The present invention relates to a pair of golf glasses. The glasses are designed to enable the golfer to measure a distance to a golf ball precisely as taking an address position, and make the golfer looking at a ball with keeping his or her head still until a clubhead hits the ball, and thereby prevent the golfer from looking-up mistake during a golf swing. The golf glasses of the present invention are characterized in that each of the lenses of the glasses includes a see-through section formed of a vertical gap corresponding to the pupil of golfer's eye, and the other part is a view shielding.

7 Claims, 2 Drawing Sheets

GOLF GLASSES

BACKGROUND OF THE INVENTION

1. Field of the Invention

The present invention relates to golf glasses, more specifically golf glasses worn by a golfer and designed to prevent a golfer from looking-up movement during a golf swing.

2. Background Art

It is often described that, in order to swing smoothly and hit a golf ball right, a golfer should take a swing with his or her eyes on the ball from first to last, in other words with keeping his or her head still during a swing motion, so as to make both body and shoulders smoothly rotate in a unified manner.

However, a beginner golfer often makes a mistake to look up toward target point too early with lifting his or her head up during the swing before impact with the ball, which is called "look-up" or "head-up" mistake.

On this matter, conventionally, in order to make a golfer to look only at a ball surely and prevent from looking-up movement before impact, JP Utility Model Publication No. Sho62-160982 and JP Published Unexamined Patent Publication No. 2003-295127 provide golf training glasses including see-through gaps on their lenses limiting golfer's viewing field.

Taken into consideration that a golfer generally measures a distance to a golf ball with looking his or her feet and the ball within a sight at address, there remain some problems to be solved while these prior arts works well, since their see-through gaps limiting golfer's viewing field are formed of a circle or a horizontally long shape, therefore they would blind his or her feet when the golfer takes the address position, furthermore interfere with measuring the distance to the ball.

On that point, the JP Utility Model Publication No. Sho62-160982 describes that a use of the device of the invention would not interfere with golfer's taking address position, however, if the width of the horizontally long shape is between 3 to 6 millimeters, actually, the ball would not be visible when the golfer looks his or her feet, on the other hand the feet would not be visible when the golfer looks at the ball, therefore the golfer would have trouble taking an address (stance) right and difficulty measuring the distance to the ball.

SUMMARY OF THE INVENTION

In consideration of the problems noted above, the present invention is intended to provide golf glasses to assist golfer's swing, particularly to enable the golfer to measure the distance to the ball precisely as taking the address position, and to keep golfer's head still and make looking at the ball until a clubhead hits the ball, in other words to prevent the golfer from looking-up movement during the swing.

The object described above will be accomplished effectively with any of the following embodiments (1) to (10) of the present invention.

(1) Golf glasses worn by a golfer to prevent from looking-up movement during swing, characterized in that a part of each of the lenses of the glasses corresponding to the pupil of the golfer's eye is a see-through section which is vertically long, and the other part is a view shielding section.
(2) Golf glasses according to (1) above wherein width of the see-through section of the lens is between 3 to 10 millimeters.
(3) Golf glasses according to (1) above wherein the see-through section of the lens is made of transparent materials.
(4) Golf glasses according to (1) above wherein the view shielding section of the lens is formed by dyeing directly the lens.
(5) Golf glasses according to (1) above wherein the view shielding section of the lens is formed by putting a sticker onto the lens.
(6) Golf glasses according to (1) above wherein the view shielding section of the lens is formed by matte finish.
(7) Golf glasses according to (1) above wherein each of the lenses of the glasses includes mirror coating so as to make the see-through section impossible to be externally distinguished from the view shielding section.
(8) Golf glasses according to (1) above wherein the see-through section of the lens is formed as a through-hole.
(9) Golf glasses according to (8) above wherein the lenses are formed by plastic injection molding.
(10) Golf glasses according to (1) above wherein the lenses of the glasses are located anterior to the lenses of the general glasses.

As described above, the golf glasses of the present invention provide the golfer with limited horizontal view since each of the lenses of the glasses includes the see-through section formed of the vertical gap corresponding to the pupil of golfer's eye, and the other section designed to shade golfer's field of view, therefore makes the golfer aware of making looking-up mistake because the ball would be go out from his or her sight if he or she would lift head up during the swing, and thereby the golfer enables to prevent from looking-up movement.

In addition, the golf glasses of the present invention allow the golfer to overlook field of view from feet to the ball within a sight, and therefore enable the golfer to measure the distance from his or her body to the ball easily since the see-through section is formed of a vertical gap as described previously.

DETAILED DESCRIPTION OF THE INVENTION

Figure 1:
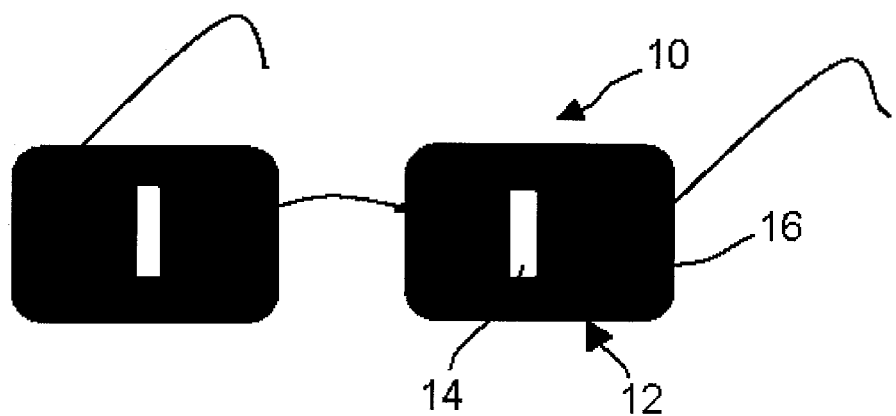
FIG. 1 is a schematic perspective view of the golf glasses according to an embodiment of the present invention.

FIG. 1 represents golf glasses 10, illustrating an embodiment of the present invention in a schematic perspective view.

The golf glasses 10 are worn by a golfer in golf training or other occasions and keep golfer's head still and prevent the golfer from looking-up movement during a golf swing.

As shown in FIG. 1, in the golf glasses 10, a part of each of the lenses of the glasses corresponding to the pupil of the golfer's eye is a see-through section 14 which is vertically long, and the other part is a view shielding section 16.

Figure 2:
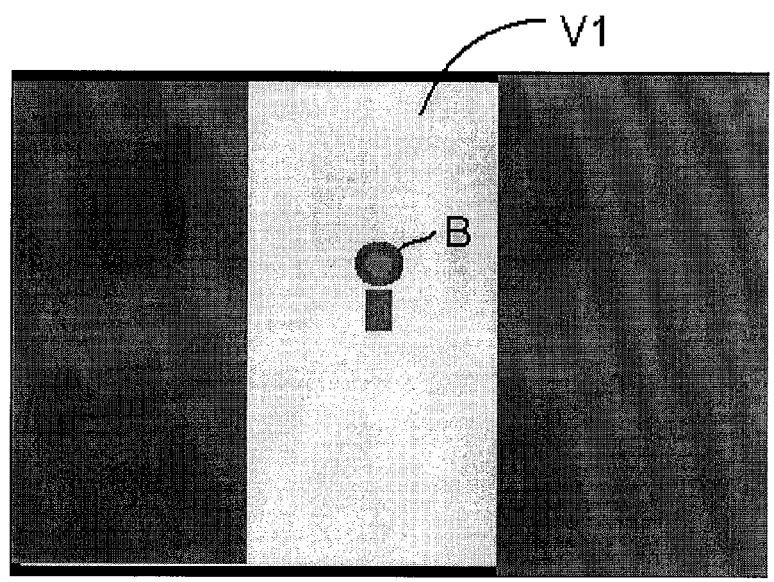
FIG. 2 is a schematic view of a field of view seen by a golfer who wears the golf glasses shown in FIG. 1.

Since the width of the see-through section 14 of the lens is narrowed, the horizontally angular range of the golfer's view V1 is limited. Therefore, when the golfer looks at ball B through the see-through section 14 as shown in FIG. 2, the golf glasses 10 prevent the golfer from looking-up movement because if the golfer lifts his or her head up only slightly, the golfer would not look at ball B within the field of view.

Figure 3:
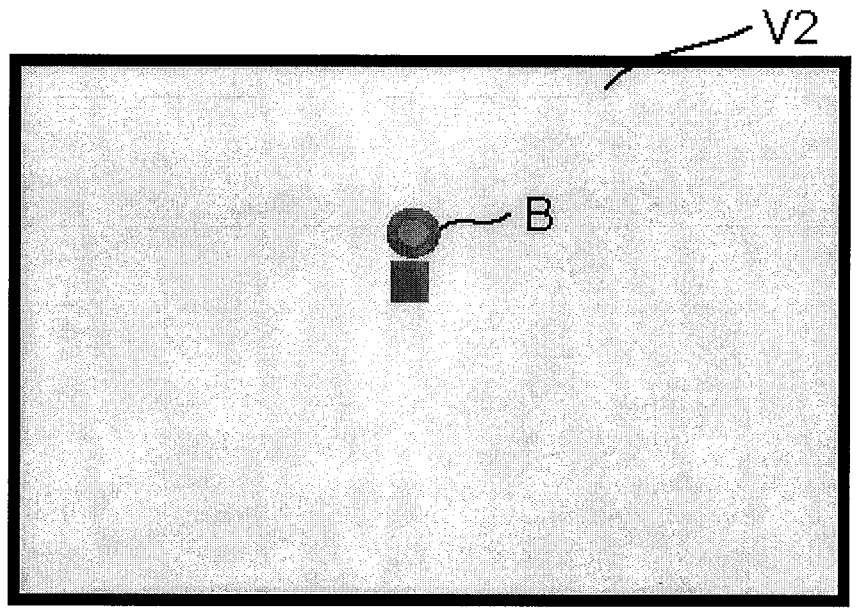
FIG. 3 is a schematic view of a field of view seen by a golfer who wears general glasses.

On the contrary, if the golf glasses don't comprise the view shielding sections, a golfer would tend to make looking-up mistake because broad field of view V2 as shown in FIG. 3 allows the golfer to look ball B even if he or she would make looking-up a little.

By comparison, if the see-through section of the lens is formed of a circle or a horizontally long shape, they would blind golfer's feet as noted above, and therefore the golfer would have difficulty measuring the distance to the ball.

The see-through section 14 has preferably between 3 to 10 millimeters width. And it is enable to adjust the width of the rest section hiding ball B with setting up wide or narrow of the width of the see-through section 14.

The see-through section 14 is preferably made of transparent materials, which include substantially completely transparent materials, translucent materials, or colored transparent materials such as sunglasses, or any other materials would be acceptable as far as ball B and others are visible for the golfer.

The view shielding section 16 may be made by dyeing directly the lens, or by attaching an unclear sticker onto the lens, or by matte finish including scratched finish, in other words any means would be acceptable as far as they can shade golfer's field of view.

Furthermore, the lenses of the golf glasses 10 are preferably formed by mirror coating so as to make the see-through section 14 impossible to be externally distinguished from the view shielding section 16. Such mirror coating would be formed in the same manner as general finishes for mirrored sunglasses.

In addition the lenses of the golf glasses of the present invention might be whether prescription type or plain type.

See-through section 14 of the lens might be also formed by a through-hole. Such type of the lens would be made by plastic injection molding with die-casting or by other means.

The golf glasses 10 might be whether in the form of general sunglasses or of which lenses located anterior to the lenses of other general glasses.

Figure 4:
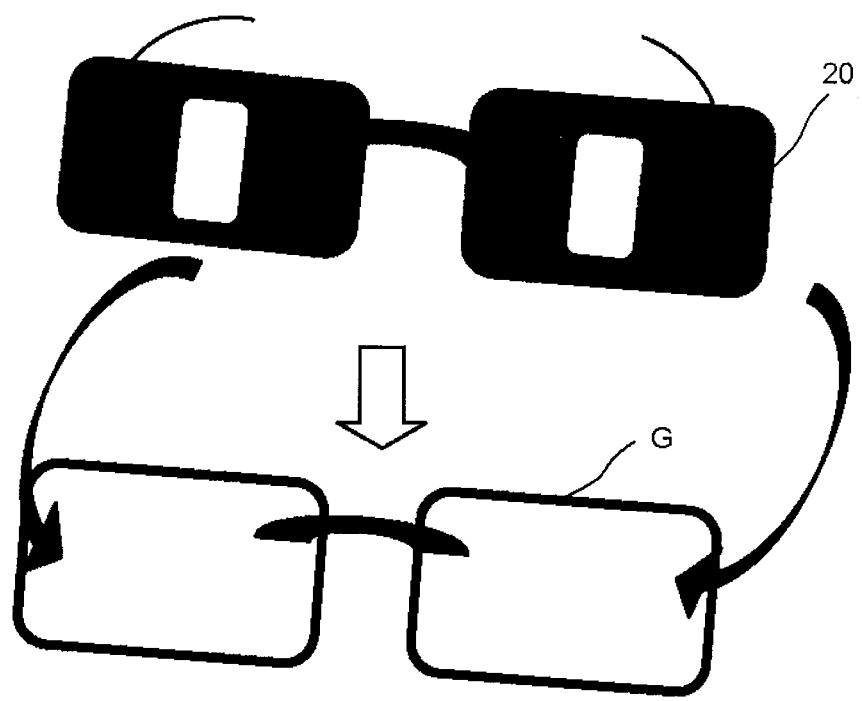
FIG. 4 is a schematic perspective view of the golf glasses according to one of the other embodiments of the present invention.

As these types of glasses, there may be flip-up type 20 which would be clipped on other general glasses G as shown in FIG. 4, or goggle type, over-glasses type which would be worn over general glasses.

As explained above, the golf glasses of the present invention provide the golfer with limited horizontal view so as to make the golfer aware of looking-up mistake since the ball would be go out from the sight if the golfer lifts his or her head up during the swing before impact, and thereby prevent the golfer from looking-up movement.

Furthermore the golf glasses of the present invention allow the golfer to overlook field of view from feet to the ball within a sight, and enable the golfer to measure distance from his or her body to the ball easily, since the see-through sections of the lenses of the glasses are vertically long as previously described.

Therefore, the golf glasses of the present invention principally for golf training have a profound effect to prevent the golfer from looking-up movement.

What is claimed is:

1. Golf glasses worn by a golfer to prevent a looking-up movement during the golf swing comprising lenses of a transparent material,
   a sticker placed on each said lens to prevent the golfer from seeing through each said lens,
   a see-through section formed in each said sticker,
   said see-through section being vertically long and positioned adjacent to the pupil of the golfer's eye, and
   a mirror coating on said lenses so as to make said see-through section indistinguishable from said sticker.

2. Golf glasses according to claim 1 wherein the see-through section formed in each said sticker is from 3 to 10 millimeters wide.

3. Golf glasses according to claim 1 wherein the see-through section of the lens is formed by a through-hole.

4. Golf glasses according to claim 3 wherein the lenses are formed by plastic injection molding.

5. Golf glasses according to claim 1 wherein the golf glasses are located anterior to another set of glasses.

6. Golf glasses worn by a golfer to prevent from a looking-up movement during the golf swing comprising lenses of a transparent material,
   a view-shielding section on each said lens to prevent the golfer from seeing through each said lens,
   a see-through section formed in each said view shielding section,
   said see-through section being vertically long and positioned adjacent to the pupil of the golfer's eye, and
   a mirror coating on said lenses so as to make said see-through section indistinguishable from said sticker,
   wherein the view-shielding section on each said lens is formed by directly dyeing each said lens.

7. Golf glasses according to claim 6 wherein the view shielding section of the lens is formed by matte finish.

* * * * *